(12) United States Patent
Tennison et al.

(10) Patent No.: US 6,496,777 B2
(45) Date of Patent: Dec. 17, 2002

(54) COLLECTING AND REPORTING INFORMATION CONCERNING MOBILE ASSETS

(75) Inventors: Lynden L. Tennison, Omaha, NE (US); Steve C. Lampe, Ft Calhoun, NE (US)

(73) Assignee: Nexterna, Inc., Omaha, NE (US)

( * ) Notice: Subject to any disclaimer, the term of this patent is extended or adjusted under 35 U.S.C. 154(b) by 0 days.

(21) Appl. No.: 09/790,371

(22) Filed: Feb. 21, 2001

(65) Prior Publication Data

US 2001/0027378 A1 Oct. 4, 2001

Related U.S. Application Data

(60) Provisional application No. 60/184,487, filed on Feb. 23, 2000.

(51) Int. Cl.$^7$ .............................................. G06F 165/00
(52) U.S. Cl. ...................... 701/213; 340/991; 73/178 R
(58) Field of Search ................................ 701/213, 200; 73/178 R; 340/991, 992, 993

(56) References Cited

U.S. PATENT DOCUMENTS

| | | | |
|---|---|---|---|
| 4,147,894 A | 4/1979 | Watanabe et al. | 179/15 A |
| 4,442,426 A | 4/1984 | Heuschmann et al. | 340/539 |
| 4,839,923 A | 6/1989 | Kotzin | 381/31 |
| 5,223,844 A | 6/1993 | Mansell et al. | 342/357 |
| 5,594,425 A | 1/1997 | Ladner et al. | 340/825.06 |
| 5,848,373 A | 12/1998 | DeLorme et al. | 701/200 |
| 5,867,804 A * | 2/1999 | Pilley et al. | 701/120 |
| 5,919,239 A | 7/1999 | Fraker et al. | 701/35 |
| 5,944,768 A * | 8/1999 | Ito et al. | 701/200 |
| 5,959,577 A | 9/1999 | Fan et al. | 342/357.13 |
| 6,072,396 A * | 6/2000 | Gaukel | 340/573.4 |
| 6,100,806 A * | 8/2000 | Gaukel | 340/573.4 |
| 6,101,443 A * | 8/2000 | Kato et al. | 701/210 |
| 6,104,338 A * | 8/2000 | Krasner | 342/357.06 |
| 6,104,712 A * | 8/2000 | Robert et al. | 370/389 |
| 6,236,365 B1 * | 5/2001 | LeBlanc et al. | |
| 6,246,320 B1 * | 6/2001 | Monroe | 340/506 |
| 6,300,875 B1 * | 10/2001 | Schafer | 340/573.1 |

* cited by examiner

Primary Examiner—William A. Cuchlinski, Jr.
Assistant Examiner—Olga Hernandez
(74) Attorney, Agent, or Firm—Jenkens & Gilchrist

(57) ABSTRACT

A mobile platform includes a GPS receiver system to collect position related information for storage in a database. Sensors further collect platform operational information for storage in the database. A control processor for the mobile platform collects the stored information for periodic transmission over a wireless communications link to a remote location for further processing and handling. The control processor is configured to periodically engage in data collection from the GPS receiver system and sensors at a first rate and remotely report any interim collected information over the wireless communications link at a second rate. Preferably, the first rate is greater than the second rate by integer multiple to most efficiently and economically utilize wireless communications resources. At the remote location, a central controller receives the mobile platform reported information for processing in accordance with tracking management applications. An interface to the central controller allows a user to control the information collection and reporting operations of the control processor (in the mobile platform) as well as the tracking management functions performed by the central controller.

23 Claims, 1 Drawing Sheet

COLLECTING AND REPORTING INFORMATION CONCERNING MOBILE ASSETS

CROSS-REFERENCE TO RELATED APPLICATION

The present invention claims priority from U.S. Provisional Application for Patent Serial No. 60/184,487 filed Feb. 23, 2000, the disclosure of which is hereby incorporated by reference.

BACKGROUND OF THE INVENTION

1. Technical Field of the Invention

The present invention relates to information collection and reporting operations and, in particular, to the collecting and reporting of information concerning mobile assets.

2. Description of Related Art

Global positioning system (GPS) receivers associated with mobile platforms (such as automobiles or airplanes) are often used to obtain position information. The process such receivers use to make position determinations from satellite signal measurements is well known to those skilled in the art. Following collection in this manner, the position information is processed in connection with stored geographic map data to visually display on a map the location of the mobile platform.

It is also known in the art for the mobile platform to communicate a piece of collected position information over a wireless communications link to a central processing facility. At this facility, the communicated position information is processed and a visual display is created showing the mobile platform position in association with a geographic map. Remote access to that geographic map containing mobile platform position information may further be obtained by an interested party by remotely accessing the central processing facility over a data network (like the Internet) using a conventional web browser.

It is further known in the art for the mobile platform to communicate a collected piece of position information over a wireless communications link to a central processing facility. At this facility, the communicated position information is processed and a geographic map including an indication of, mobile platform position is created. The geographic map may then be communicated back over the wireless communications link for presentation and display within the mobile platform itself.

SUMMARY OF THE INVENTION

A GPS receiver system located on a mobile platform collects position related information. This position information, along with operational information collected by platform sensors, is stored in a database on the mobile platform. The collected and stored information is then periodically transmitted over a wireless communications link to a remote location for further processing and handling. The position and operational information is periodically collected at a first rate and thereafter remotely reported over the wireless communications link at a second rate. Preferably, the first rate is greater than the second rate by a positive integer multiple that is greater than one such that plural time instant collected information is reported in a single communication. Furthermore, the actual time instant for remote transmission is determined when a randomly or pseudo randomly selected offset time period expires as measured following each occurrence of the second rate.

More specifically, the GPS receiver system generates a clock signal and the first and second rates for controlling information collection and transmission, respectively, are measured using a modulo processing operation as applied against the GPS clock signal. In this configuration, the first rate comprises an X time period and the second rate comprises a Y time period, with the expiration of the first and second rate determined by counting modulo X and Y, respectively.

At the remote location, a central controller receives the mobile platform reported information for processing in accordance with tracking management applications. An interface to the central controller allows a user to control the information collection and reporting operations of the control processor (in the mobile platform) as well as the tracking management functions performed by the central controller.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
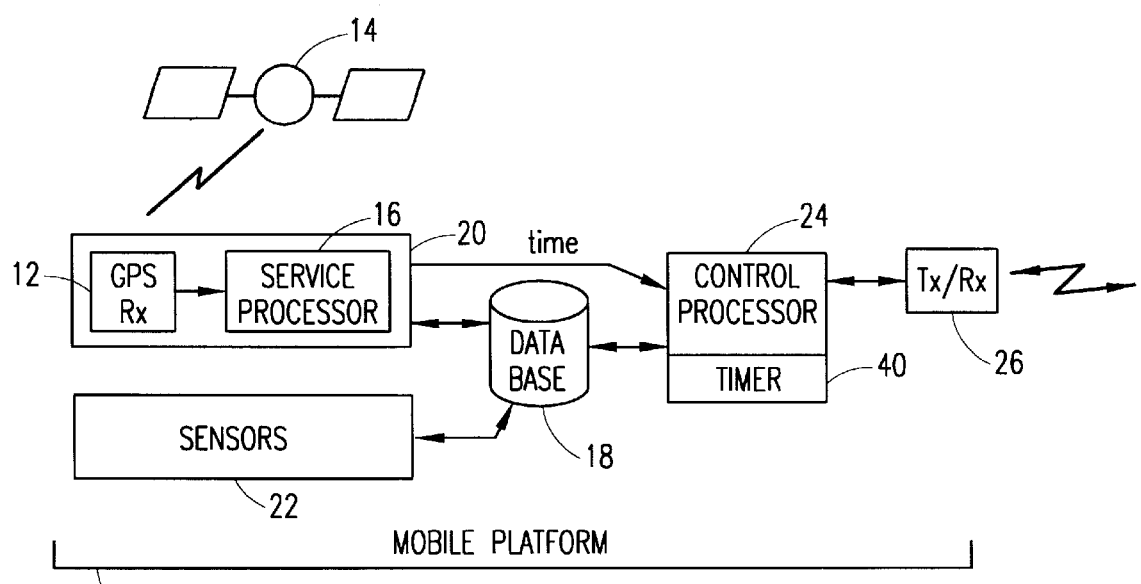
FIG. 1 is a block diagram of a mobile platform configured for operation in accordance with the present invention.

Reference is now made to FIG. 1 wherein there is shown a block diagram of a mobile platform 10 configured for operation in accordance with the present invention. The mobile platform 10 may comprise any mobile asset that an entity desires to track and monitor for status. Examples of such mobile assets include railroad locomotives, automobiles (for example, driven by teenagers, nannies, and the like), taxicabs, fleet/delivery vehicles, tug boats and barges, mobile professionals (i.e., human beings who are on the move such as salespersons), laptop computers, palm-top computers, and the like.

The mobile platform 10 includes a GPS receiver 12 that collects and makes measurement on signals broadcast from orbiting GPS satellites 14 in a manner well known to those skilled in the art. A GPS service processor 16 then mathematically processes the received signal measurements in accordance with well known GPS techniques to determine position related information. This position related information may comprise the actual geo-coordinates (longitude, latitude and altitude) of the GPS receiver 12 (and hence, the mobile platform 10), or other information (such as pseudo-ranges, ephemeris, and the like) that is indicative of position. The determined position related information is then stored in a database 18.

Although illustrated as separate components, the GPS receiver 12 and GPS service processor 16 may comprise a single GPS receiver system 20 component.

The mobile platform 10 further includes a series of platform sensors 22 that collect sensor information relating to the operation and condition of the mobile platform itself. This sensor 22 collected information may include any one or more of the following pieces of information: current fuel or other fluid level, direction, temperature (internal or external), pressure (internal or external), speed, and the like. This collected information is also stored in the database 18.

A control processor 24 manages operation of the GPS receiver system 20 and platform sensors 22 with respect to controlling the actions taken by those components to collect and store position related information and sensor information for the mobile platform 10. More particularly, and in response to remote configuration commands (to be described in more detail herein), the control processor 24 exercises control over the timing (or rate) with which the GPS receiver system 20 and platform sensors 22 take their information collection actions. Preferably, the actions taken to collect and measure GPS signals and collect sensor information are made substantially simultaneously with each other so that each piece of sensor information can be tied not only to a specific time reference but also to a specific positional reference.

A transceiver 26 is connected to the control processor 24 to allow for remote bi-directional communications (for example, wireless data messaging) to occur. The transceiver 26 may facilitate remote communication over any one or more of a number of different types of communications media (such as satellite, cellular, group mobile radio, and the like). The transceiver 26 includes all necessary hardware (including a modem) needed to effectuate remote bi-directional communications over the selected media.

The control processor 24 manages communication operation for the mobile platform 10 of the transceiver 26 with respect to actions taken to engage in bi-directional data communications. More particularly, and in response to remote configuration commands (to be described in more detail herein), the control processor 24 exercises control over the timing (or rate) with which the mobile platform remotely reports the database 18 stored information comprising the position related information determined by the GPS receiver system 20 component and the mobile platform operation and condition information collected by the platform sensors 22. Preferably, the actions taken to remotely report the database 18 stored information are made much less frequently than the data is collected and stored. For example, one preferred embodiment of the present invention collects and stores information once every fifteen minutes and engages in a remote reporting of that stored information once every four hours. By operating in this manner, the mobile platform makes more efficient and economic use of the transceiver and the remote wireless (air interface) communication media connection for data communication because each remote communications includes a plurality of temporally distinct pieces of information.

In many mobile platform operation and data reporting applications, it is important to exercise somewhat precise timing control over the actions that are taken for data collection/storage and remote reporting. This is especially a concern when many (perhaps hundreds or thousands of) mobile platforms are simultaneously engaging in operations to collect, store and remotely report information to a single interested remote entity or party (such as a central mobile asset management organization).

As mentioned above, the control processor 24 of the mobile platform responds to remote configuration commands that may be input by a mobile platform user (such as a vehicle driver) or received as a wireless data communication (for example, from the central mobile asset management organization). These commands generally identically set the same two timing values in the control processor 24 of each mobile platform associated with a given organization. The first (t1) value is a timing value used to measure an interval between the actions taken to collect and measure GPS signals and collect sensor information in a substantially simultaneous manner. In some applications, it may not be necessary for each or plural organizationally associated mobile platforms to be configured with identical first values. The second (t2) value is a timing value used to measure an interval between the actions taken to remotely report the database 18 stored information. Generally speaking, all organizationally associated mobile platforms are set with the same second value in order to exercise some level of control over when remote reports are made. Setting all organizationally related mobile assets with the same t1 and t2 values is preferred because it ensures that temporally comparable data is collected and reported by all mobile platforms. This is especially useful when the mobile assets being managed are similar or identical pieces of equipment (such a locomotive, taxi or delivery fleet vehicle).

A preference is made for the remote reporting action to be made much less frequently than the data collection and storage action in order to include plural temporally distinct pieces of information in each mobile platform transmission. Thus, the value for t2 is set greater than the value of t1. Generally speaking, the t2 value is set to be a positive integer multiple of the t1 value, with the integer multiple being greater than one. For the example discussed above, the t1 value would be set at fifteen minutes (i.e., 900 seconds) and the t2 value would be set at four hours (i.e., 14,400 seconds or sixteen times t1).

The control processor 24 further determines for itself, perhaps using a random or pseudo-random selection process, a third (t3) value that comprises a timing value used to measure a reporting transmission offset in time from the second (t2) value. Although a random or pseudo-random selection process is preferred, it will be understood that the t3 value may instead be explicitly set for each mobile platform by the central mobile asset management organization, and further that a command may be issued at certain times (for example, if the reporting interval t2 is changed) to change the t3 value or force a re-determination of the randomized t3 value. This offset in time specifies for the mobile platform the specific instant when (following expiration of the t2 interval) the control processor 24 should activate the transceiver and remotely report the database 18 stored information. By tying the remote reporting action to the combination of the t2 and t3 values, this ensures (or a least promotes) an even distribution in time of the actions taken by each of plural organizationally associated mobile platforms to engage in a remote data report. If the reporting instant were instead simply tied to the t2 value, all mobile platforms associated with a given organization would simultaneously make their remote reports, and this could both congest the remote wireless (air interface) connection and overload the remote organization's reception and processing capabilities.

In a preferred embodiment of the invention, the random or pseudo-random process selects the t3 value such that the value is no more than one half the t2 value. The reason for this is that it forces all organizationally related mobile platforms to make their reports in a front half of the t2 interval. It will, of course, be understood that the t3 value and its relationship to the t2 value may be set in any preferred way sufficient to enable mobile platform reporting to occur in an efficient and economical manner. When t2 and t3 are configured in the way discussed above, this leaves the back half of the t2 interval free for mobile platforms to attempt re-transmissions in the event there is congestion and delivery failure during the front half. The back half of the t2 interval is further available to allow the central mobile asset management organization to communicate with the mobile platform (to engage in, for example, parameter updating or issuance of operational commands).

As is well known to those skilled in the art, the GPS receiver system 20 component processes the received satellite signals to not only determine position information but also to obtain a very accurate timing reference. This GPS supplied timing reference is provided to the control processor 24 for the mobile platform, with the control processor then keeping an internal clock 40 synchronized to GPS time. GPS time is kept by the processor 24 (and reported by the system 20) in terms of a week number (that ranges from 0 to 1023), and a time of the week (that ranges from 0 to 603,799 seconds). It will, of course, be understood that in mobile platform configurations that do not include a GPS receiver, the processor may keep its own clock reference based on a initial time synchronization. The process for determining when to instruct the GPS receiver system 20 and platform sensors 22 to take their information collection actions involves programming the control processor 24 with an executable instruction to perform a modulus operation on the clock 40 value with the t1 value (specified in seconds) as the modulus parameter. Similarly, the process for determining when to remotely report the database 18 stored information comprising the position related information determined by the GPS receiver system 20 component and the mobile platform operation and condition information collected by the platform sensors 22 involves programming the control processor 24 with an executable instruction to perform a modulus operation on the clock 40 value with the t2 value (specified in seconds) as the modulus parameter. Actual transmission is then made t3 value clock 40 counted seconds after the t2 modulus operation is satisfied.

Figure 2:
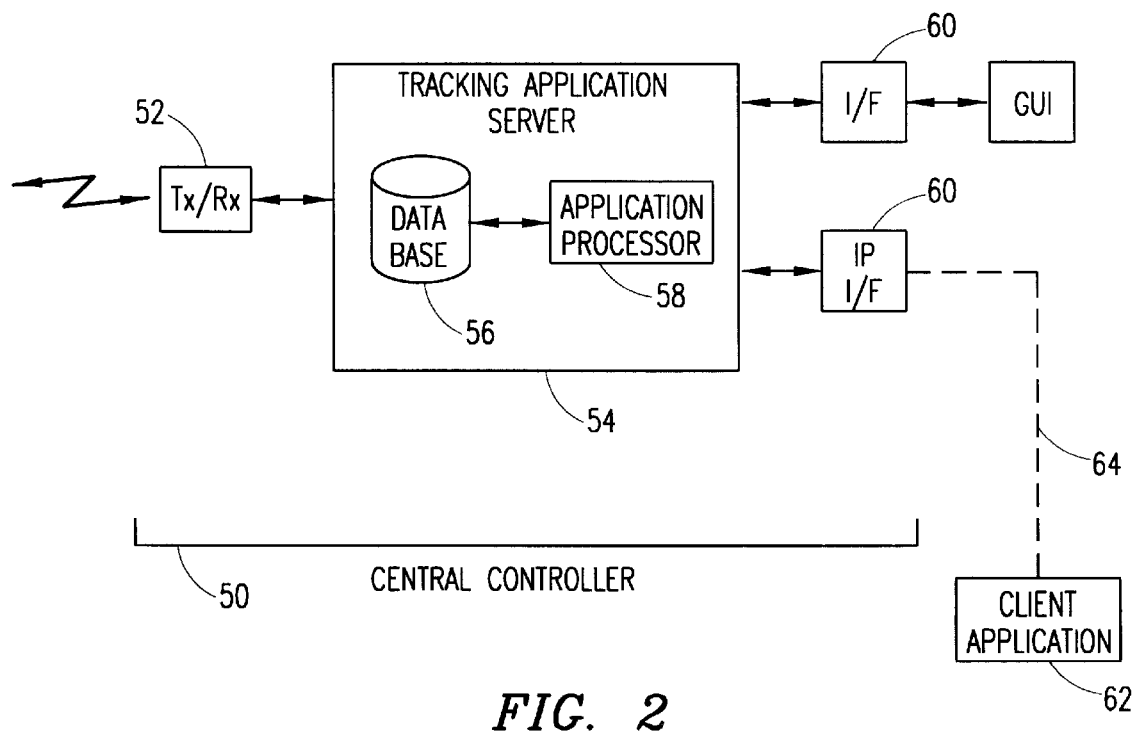
FIG. 2 is a block diagram of a central controller configured for operation in accordance with the present invention.

Reference is now made to FIG. 2 wherein there is shown a block diagram of a central controller 50 (for example, associated with the remote organization) configured for operation in accordance with the present invention. The central controller 50 includes a transceiver 52 that engages in remote bi-directional communications (for example, wireless data messaging) with a plurality of mobile platforms (see, FIG. 1). Through the transceiver 52, the controller 50 collects mobile platform wireless reported information comprising the position related information determined by the GPS receiver system 20 component and the mobile platform operation and condition information collected by the platform sensors 22. The transceiver 52 is also used by the controller 50 to issue over the wireless communication media the remote configuration commands that set the t1 and/or t2 and/or t3 intervals (as discussed above) or other parameters, and further command the mobile platform to report its operational parameters so that these values are centrally known for each platform. With this information, the central controller is in possession of sufficient information to know when it should receive reports from a mobile platform and when it is the best time to issue commands to the mobile platform. A tracking application server 54 is connected to the transceiver 52. The server 54 operates to manage the tracking operation for the organization. This operation includes configuring mobile platform control processors with the proper ti and t2 values, storing mobile platform periodically reported position related information and operation and condition information, and processing the stored information to collect, collate and present mobile asset tracking information for third party review and handling. The server 54 includes a database 56 used to store raw, intermediate and final data concerning the reception and processing of the mobile platform periodically reported position related information and operation and condition information. A tracking application processor 58 accesses the database 56 to retrieve the stored information and manipulates the information in accordance with certain programming tasks to reformulate and present the information in a way that conveys usable and user friendly information concerning asset management issues. The central controller 50 further includes a user interface 60 connected to the server 54. This user interface 60 may comprise a graphical user interface (GUI) that allows a user to gain access to the raw, intermediate and final data, as well as to exercise some control over the issuance of remote configuration commands. Alternatively, the interface 60 may comprise an Internet protocol (IP) communications link interface allowing a user (comprising a client application 62) to gain access to the raw, intermediate and final data, as well as to exercise some control over the issuance of remote configuration commands, over a data communications link (perhaps through the use of web enabled technology) 64.

The operation of the server 54 may be better understood through the analysis of some examples. First, take a mobile asset associated with an organization interested in ensuring that the mobile assets are properly utilized solely in conjunction with business operations. Mobile platform periodically collected and reported position information is processed by the server 54 to generate geographic maps which show paths of movement for each mobile platform. From these maps, the organization may confirm that the mobile platforms did not venture from expected areas of work and further confirm that the mobile platforms were not used for personal matters. With the addition of timing information (as reported by the mobile platforms with the position and other information), the maps may further illustrate the timing of mobile platform movements to ensure that the assets were being efficiently utilized (i.e., that they were not stationary/idle for an unacceptable period of time or at an unacceptable location). Second, consider asset management issues relating to the operation and health of the mobile platforms. Speed information collected by the mobile platform sensors may be correlated with position data to determine whether, the mobile platform was being operated at excessive (illegal) speeds. Sensor collected data relating to temperature and pressure may be collected and interpreted over time to provide an indication of the health of the mobile platform and perhaps catch, before actual platform failure, a need to remove the platform from service in order perform routine or preventative maintenance. Third, consider the issue of efficient usage of a mobile asset. Position and sensor data relating to mobile platform operation may be interpreted to evaluate asset utilization issues (i.e., when and how often is the asset being productively utilized). Time constraints (hourly, daily, weekly) may be applied to the data in order to provide a time context with respect to utilization. With this information, under-utilized assets may be identified and perhaps reassigned for work in other areas or for other tasks. Fourth, a minimalist "black box" recorder type operation may be performed in that important operational data (speed, direction, health, condition, and the like) may be collected, stored and transmitted. In the event of an accident or other incident, the data may be retrieved and interpreted as an aid to determining, cause. Other processing and interpretation operations may be performed by the server 54 with mobile platform periodically reported position related information and operation and condition information.

The transceivers 26 and 52 include appropriate modem components to assist in data communications over the wireless link. The operation of these modem components to set-up and engage in data communications is well known to those skilled in the art. As an enhancement whereby more efficient and economic data communication are accomplished, the modems within the transceivers 26 and 52 may make use of a selective modem negotiation procedure as taught by co-pending, commonly assigned U.S. application for patent Ser. No. 09/790,288 entitled "Selective Modem Negotiation Operation for Data Reporting Calls" by Lampe, et al., the disclosure of which is hereby incorporated by reference.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for collecting and remotely reporting mobile platform related information, comprising:
    a GPS receiver system operable to collect mobile platform position related information;
    a sensor operable to collect mobile platform operational information;
    a database storing the collected position related information and mobile platform operational information;
    a processor operable to control operation of the GPS receiver system and sensor to collect position related information and mobile platform operational information for database storage at a first rate, the processor further controlling actions to remotely communicate any interim collected position information and mobile platform operational information from the mobile platform to a remote location at a second rate, wherein the first rate is a positive integer multiple of the second rate greater than one; and
    a transceiver operable to remotely communicate the position related information and mobile platform operational information over a wireless communications link to the remote location at the second rate.

2. The system of claim 1 wherein the mobile platform position related information and mobile platform operational information are remotely communicated substantially simultaneously at the second rate.

3. A system for collecting and remotely reporting mobile platform related information, comprising:
    a GPS receiver system operable to collect mobile platform position related information;
    a database storing the collected position related information;
    a processor operable to control operation of the GPS receiver system to collect position related information for database storage at a first rate, the processor further controlling actions to remotely communicate any interim collected position information from the mobile platform to a remote location at a second rate, wherein the first rate is a positive integer multiple of the second rate greater than one;
    a transceiver operable to remotely communicate the position related information over a wireless communications link to the remote location at the second rate; and
    a timer associated with the processor and operable to time the first and second rates, the processor operating responsive to timer expiration of the first rate to control information collection and storage and responsive to time expiration of the second rate to control remote communication of the information.

4. The system of claim 3 wherein the GPS receiver system generates a GPS time reference to which the clock is synchronized.

5. The system of claim 4 wherein the first rate comprises an X time period and the second rate comprises a Y time period, and wherein the processor determines expiration of the first and second rate by counting modulo X and Y, respectively.

6. The system of claim 3 wherein the processor delays remote communication of the information following expiration of each consecutive second rate by an offset time period.

7. The system of claim 6 wherein the offset time period is a randomly or pseudo-randomly selected time delay.

8. A mobile asset tracking system for use with a plurality of mobile platforms, comprising:
    a central data collection center monitoring the plurality of mobile platforms; and
    each of the plural mobile platforms including:
        a GPS receiver system operable to collect mobile platform position related information;
        a sensor operable to collect mobile platform operational information;
        a database storing the collected position related information and mobile platform operational information;
        a processor operable to control operation of the GPS receiver system and sensor to collect position related information and mobile platform operational information for database storage at a first rate, the processor further controlling actions to remotely communicate any interim collected position information and mobile platform operational information from the mobile platform to the central data collection center at a second rate, wherein the first rate is a positive integer multiple of the second rate greater than one; and
        a transceiver operable to remotely communicate the position related information and mobile platform operational information over a wireless communications link to the central data collection center at the second rate.

9. A mobile asset tracking system for use with a plurality of mobile platforms, comprising:
    a central data collection center monitoring the plurality of mobile platforms; and
    each of the plural mobile platforms including:
        a GPS receiver system operable to collect mobile platform position related information;
        a database storing the collected position related information;
        a processor operable to control operation of the GPS receiver system to collect position related information for database storage at a first rate, the processor further controlling actions to remotely communicate any interim collected position information from the mobile platform to the central data collection center at a second rate, wherein the first rate is a positive integer multiple of the second rate greater than one; and
        a transceiver operable to remotely communicate the position related information over a wireless communications link to the central data collection center at the second rate;
        wherein the processor in each mobile platform delays remote communication of its collected information following expiration of each consecutive second rate by an offset time period selected by that mobile platform.

10. The system of claim 9 wherein the offset time period is a random or pseudo-random time delay individually selected by each mobile platform.

11. The system of claim 8 wherein the mobile platform position related information and mobile platform operational information are remotely communicated substantially simultaneously at the second rate.

12. A mobile asset tracking system for use with a plurality of mobile platforms, comprising:
    a central data collection center monitoring the plurality of mobile platforms; and each of the plural mobile platforms including:
  a GPS receiver system operable to collect mobile platform position related information;
  a database storing the collected position related information;
  a processor operable to control operation of the GPS receiver system to collect position related information for database storage at a first rate, the processor further controlling actions to remotely communicate any interim collected position information from the mobile platform to the central data collection center at a second rate, wherein the first rate is a positive integer multiple of the second rate greater than one;
  a trasceiver operable to remotely communicate the position related information over a wireless communications link to the central data collection center at the second rate; and
  a timer associated with the processor and operable to time the first and second rates, the processor operating responsive to timer expiration of the first rate to control information collection and storage and responsive to time expiration of the second rate to control remote communication of the information.

13. The system of claim 12 wherein the GPS receiver system of each mobile platform generates a GPS time reference to which the clock is synchronized.

14. The system of claim 13 wherein the first rate comprises an X time period and the second rate comprises a Y time period, and wherein the processor determines expiration of the first and second rate by counting modulo X and Y, respectively.

15. A mobile asset tracking system for use with a plurality of mobile platforms, comprising:
  a central data collection center monitoring the plurality of mobile platforms and
  each of the plural mobile platforms including:
    a GPS receiver system operable to collect mobile platform position related information;
    a database storing the collected position related information;
    a processor operable to control operation of the GPS receiver system to collect position related information for database storage at a first rate, the processor further controlling actions to remotely communicate any interim collected position information from the mobile platform to the central data collection center at a second rate, wherein the first rate is a positive integer multiple of the second rate greater than one; and
    a transceiver operable to remotely communicate the position related information over a wireless communications link to the central data collection center at the second rate;
  wherein the second time period is set to be the same in each of the plural mobile platforms, and wherein the processor in each mobile platform delays remote communication of its collected information following expiration of each consecutive second rate by an offset time period individually selected by that mobile platform.

16. The system of claim 15 wherein the offset time period is a random or pseudo-random time delay individually selected by each mobile platform.

17. The system of claim 12 wherein the central data collection center comprises:
  a database storing the information transmitted by each of the plural mobile platforms; and
  a tracking application executed to process the stored information and generate output information concerning mobile asset use.

18. A mobile asset tracking system for use with a plurality of mobile platforms, comprising:
  a central data collection center monitoring the plurality of mobile platforms; and
  each of the plural mobile platforms including:
    a GPS receiver system operable to collect mobile platform position related information;
    a database storing the collected position related information;
    a processor operable to control operation of the GPS receiver system to collect position related information for database storage at a first rate, the processor further controlling actions to remotely communicate any interim collected position information from the mobile platform to the central data collection center at a second rate, wherein the first rate is a positive integer multiple of the second rate greater than one; and
    a transceiver operable to remotely communicate the position related information over a wireless communications link to the central data collection center at the second rate;
  wherein the central data collection center specifies for each of the plural mobile platforms the first and second rates.

19. A system for collecting and remotely reporting mobile platform related information, comprising:
  a sensor operable to collect mobile platform operational information;
  a database storing the collected operational information;
  a processor operable to control operation of the sensor to collect operational information for database storage at a first rate, the processor further controlling actions to remotely communicate any interim collected operational information from the mobile platform to a remote location at a second rate, wherein the first rate is a positive integer multiple of the second rate greater than one;
  a transceiver operable to remotely communicate the operational information over a wireless communications link to the remote location at the second rate; and
  a timer associated with the processor and operable to time the first and second rates, the processor operating responsive to timer expiration of the first rate to control information collection and storage and responsive to time expiration of the second rate to control remote communication of the information.

20. The system of claim 19 further including GPS receiver system operable to generate a GPS time reference to which the clock is synchronized.

21. The system of claim 19 wherein the first rate comprises an X time period and the second rate comprises a Y time period, and wherein the processor determines expiration of the first and second rate by counting modulo X and Y, respectively.

22. The system of claim 19 wherein the processor delays remote communication of the information following expiration of each consecutive second rate by an offset time period.

23. The system of claim 22 wherein the offset time period is a randomly or pseudo-randomly selected time delay.

* * * * *

UNITED STATES PATENT AND TRADEMARK OFFICE
CERTIFICATE OF CORRECTION

PATENT NO. : 6,496,777 B2
DATED : December 17, 2002
INVENTOR(S) : Lynden L. Tennison et al.

It is certified that error appears in the above-identified patent and that said Letters Patent is hereby corrected as shown below:

Column 5,
Line 55, replace "proper ti and t2" with -- proper t1 and t2 --

Column 6,
Line 51, replace "determining, cause." with -- determining cause. --

Column 9,
Line 14, replace "a trasceiver" with -- a transceiver --

Signed and Sealed this

Twenty-ninth Day of April, 2003

JAMES E. ROGAN
*Director of the United States Patent and Trademark Office*